(12) United States Patent
Pangilinan et al.

(10) Patent No.: US 10,836,957 B2
(45) Date of Patent: Nov. 17, 2020

(54) SUSPENDING PROPPANTS WITH POLYMERIZED HYDROGELS

(71) Applicant: CASE WESTERN RESERVE UNIVERSITY, Cleveland, OH (US)

(72) Inventors: Katrina Pangilinan, Corryton, TN (US); Al de Leon, Cleveland, OH (US); Rigoberto Advincula, Shaker Heights, OH (US)

(73) Assignee: CASE WESTERN RESERVE UNIVERSITY, Cleveland, OH (US)

( * ) Notice: Subject to any disclaimer, the term of this patent is extended or adjusted under 35 U.S.C. 154(b) by 0 days.

(21) Appl. No.: 15/798,935

(22) Filed: Oct. 31, 2017

(65) Prior Publication Data

US 2018/0119006 A1    May 3, 2018

Related U.S. Application Data

(60) Provisional application No. 62/415,049, filed on Oct. 31, 2016.

(51) Int. Cl.

| | |
|---|---|
| *C09K 8/80* | (2006.01) |
| *C09K 8/68* | (2006.01) |
| *C09K 8/88* | (2006.01) |
| *C09D 133/26* | (2006.01) |
| *C09D 4/00* | (2006.01) |
| *C08F 220/56* | (2006.01) |
| *E21B 43/267* | (2006.01) |

(52) U.S. Cl.
CPC ............ *C09K 8/805* (2013.01); *C08F 220/56* (2013.01); *C09D 4/00* (2013.01); *C09D 133/26* (2013.01); *C09K 8/685* (2013.01); *C09K 8/887* (2013.01); *C09K 2208/26* (2013.01); *C09K 2208/32* (2013.01); *E21B 43/267* (2013.01)

(58) Field of Classification Search
CPC ........ C09K 8/805; C09K 8/685; C09K 8/887; C09K 2208/26; C09K 2208/32; E21B 43/267
See application file for complete search history.

(56) References Cited

U.S. PATENT DOCUMENTS

| | | | |
|---|---|---|---|
| 9,315,721 B2 | 4/2016 | Mahoney et al. | |
| 2013/0233545 A1* | 9/2013 | Mahoney | C09K 8/80 166/280.2 |
| 2014/0318775 A1 | 10/2014 | Cannan et al. | |
| 2017/0096598 A1* | 4/2017 | Vo | C09K 8/5751 |
| 2017/0183563 A1* | 6/2017 | Stanciu | C09K 8/512 |
| 2018/0201828 A1* | 7/2018 | Pravesh | C09K 8/64 |
| 2018/0346801 A1* | 12/2018 | Dandawate | C09K 8/506 |

* cited by examiner

Primary Examiner — Crystal J Miller
(74) Attorney, Agent, or Firm — Hudak, Shunk & Farine Co. LPA (57) ABSTRACT

Hydrogel-coated proppants and methods for manufacture thereof. In preferred embodiments, the hydrogel coating is covalently attached and crosslinked to the proppant substrate in a core-shell structure. The enhanced proppant provides great flexibility in terms of functionalities that can be incorporated into the hydrogel coating. Also, the swelling behavior and mechanical properties of the hydrogel coating can be tailored as desired by varying the amounts of components in the composition such as monomer, crosslinker, polymer, silane comonomer, and initiator.

13 Claims, 6 Drawing Sheets

SUSPENDING PROPPANTS WITH POLYMERIZED HYDROGELS

FIELD OF THE INVENTION

The present invention relates to hydrogel-coated proppants and methods for manufacture thereof. In preferred embodiments the hydrogel coating is covalently attached and crosslinked to the proppant substrate in a core-shell structure. The enhanced proppant provided great flexibility in terms of functionalities that can be incorporated into the hydrogel coating. Also, the swelling behavior and mechanical properties of the hydrogel coating can be tailored as desired by varying the amounts of components in the composition such as monomer, crosslinker, polymer, silane comonomer, and initiator.

BACKGROUND OF THE INVENTION

Hydraulic fracturing is a process of breaking down geologic formations using fluids pumped at very high pressures to create conductive pathways for the collection oil and/or gas, see Britt, L., Fracture stimulation fundamentals. J. Nat. Gas. Sci. Eng., 8, 2012, 34-51. Once fractures are formed, propping agents or proppants are pumped into the well to prop open fractures and keep them from closing once the pumping pressure is removed.

Selecting the right proppant is crucial in optimizing wellbore production. They should have sufficient mechanical strength, be conductive to fluid, have low density, and be inexpensive to produce. The proppant should withstand the enormous crushing force under the geologic formations with minimal production of proppant fines. Failure of the proppant to support and open the fractures limits the cross-sectional area for the oil or gas to flow through, which causes a significant decrease in the conductivity of the reservoir formation. The need for a low density proppant stems from the fact that the proppants are suspended in liquid and are pumped into the formation. Heavy proppants tend to settle unless a very viscous hydraulic fracturing fluid is used. The increase in the viscosity of the hydraulic fluid causes the pumping energy requirement to also increase. Sand has low density and is the cheapest proppant material but it has low crush resistance; thus, they can only be used in shallow reservoirs, see O'Brien, F., Haller, C., Ceramic proppants. U.S. Ser. No. 12/986,479, Oct. 3, 2013. Man-made ceramic proppants have higher densities, better mechanical strength and crush resistance which allows them to be used in high pressure wells. However, they require higher pumping rates and pumping energies, and more viscous fluids to carry them down the reservoir without settling. The viscosity of the fluid is increased by adding synthetic or naturally-based polymers. Guar gums and guar derivatives such as hydropropyl guar, carboxymethyl guar, and carboxymethyl hydropropyl guar are the most common component of fracturing fluids, see Brannon, H. D., Hodge, R. M., England, K. W., High temperature guar-based fracturing fluid. U.S. Pat. No. 4,801,389, Jan. 31, 1989. Crosslinking organometallic ions are typically added to these linear gels to produce crosslinked gels that provide higher viscosity which improves proppant transport. Polyacrylamide, polyacrylates, xanthan and cellulose derivatives such as hydroxyethyl cellulose or hydroxypropyl cellulose and carboxymethylhydroxyethyl cellulose are also used. Linear and crosslinked gel fluids are effective in suspending proppants. However, they require high concentration of expensive polymers that eventually have to be cleaned up after delivering the proppants.

Modifying the proppant surface can impart desirable properties onto the proppant. For example, the mechanical properties and crush resistance can be improved by coating the proppant with phenolic resin. Coating the proppant with resin also limits the amount of crush fines released onto the fractures, which blocks the flow of oil and/or gas and may damage the production equipment, see Barmatov, E. B., Lyapunov, K. M., Golovin, A. V., Particulate material for proppant flowback control. U.S. Pat. No. 7,718,583, May 18, 2010. Proppant flowback or the loss of proppant from fractures can be lessened by using an adhesive coating which can form networks that hold the proppants in place, thereby, imparting strength and stability to the proppant pack. Resin coatings, however, can be expensive, and can detach, causing environmental concerns and settling out of the fluid. The decision to use uncoated or coated proppant (or which coating) largely depends on the conditions within the formation and the working knowledge of the petroleum engineer. Though the advantages and limitations of the different proppant types are well known, precise placement of proppants still remains the highest priority.

US Patent 20130233545 addressed this problem by coating proppant particles with hydrogel. The hydrogel coating reportedly improves the transport of proppants farther down the well and into fractures by preventing their settling. It also decreases the need for a highly viscous fluid since the particle can easily be dispersed in aqueous fluid. As detailed in the publication, the sand proppants were initially coated with a cationic polymer such as polydiallyldimethylammonium chloride (PDAC) or polyethyleneimine (PEI). The coated sand was dried, mixed with liquid Flopam EM533 (copolymer of acrylic acid and acrylamide), and heated at 80° C. overnight to remove water or other solvents. PDAC interacts ionically with Flopam EM355 to stabilize the coating layers. Settling test was performed by adding 1 g of sand into 100 mL water in a graduated cylinder, and measuring the time it takes for the sand to settle at the bottom. Without a coating the sand settles after 10 s while the coated sand settles after a longer time. The settled bed height was also measured 30 min after adding 1 g of sand into 10 g water in a vial. Bed height of uncoated sand is measured at 0.8 mm, while coated sand bed height ranges from 6.9 to 22.9 mm depending on the concentration used and thickness of Flopam EM355 coating that is applied. This system, however, can have a few disadvantages. The initial layer of cationic polymer is physically adsorbed and held onto the sand which is prone to desorption under the high shear conditions associated with pumping of a fracturing fluid down the wellbore. Also, the weak ionic interactions of the polyelectrolytes used can be sensitive to brine conditions.

SUMMARY OF THE INVENTION

In view of the prior art noted above, as well as the problems thereof, the present invention provides a modified proppant in the form of hydrogel-coated proppants, wherein the coating is covalently attached by in-situ polymerization to the proppant. In a preferred embodiment, the coating is derived from a copolymerization reaction of at least two monomers and/or polymers, one of which can covalently attach or tether to the proppant and another than can be swelled by water. The polymer can either be a coating additive or a reactive telechelic polymer that participates in the coating process either by physical blending or reactive crosslinking. The change in the ratio between the monomer, the crosslinker, and the added polymer defines the hydrogel swelling behavior and stability of the coating in terms of its adhesion properties. Beneficially, the modification not only improves the adhesion of the hydrogel on the proppant, but also allows various additives to be covalently introduced into the hydrogel matrix, which can be released at a later time in a controlled manner.

In a further object of and embodiment of the present invention, the methods for preparing the modified proppants include the step of simultaneously polymerizing and coating a hydrogel on the surface of a proppant, incorporating the various compositions and reactions conditions to obtain the desired property of swelling.

Still another object and embodiment of the present invention is to provide a modified proppant having a hydrogel coating that includes a further additive that is either covalently bonded or physically trapped within the hydrogel matrix. This can involve non-covalent forces of attraction such as hydrogen bonding, ion-metal-complexation, dipole-metal interaction, van der Waals forces, electrostatic interaction, that supplements the covalent reaction due to cross-linking or polymerization. For example, additives may include corrosion inhibitors, scaling inhibitors, biocides, fluid loss additives, tracers, or breakers.

In one aspect a modified proppant is disclosed comprising a proppant particle and a hydrogel-coating covalently bonded or non-covalently coated to the proppant particle, the hydrogel-coating derived from a composition including at least one monomer that is covalently attached to the proppant particle and at least one monomer that is water swellable.

In a further aspect a hydrogel-coated proppant is disclose comprising a proppant particle having a coating, wherein the coating is a water-swellable polymer that is polymerized from a monomer selected from one or more of 2-acrylamido-2-methylpropane sulfonic acid (AMPS), acrylamide (AM), and N-isopropylacrylamide (NIPAM), hydroxyethyl methacrylate (HEMA), hydroxyethyl acrylate (HEA), poly (ethylene glycol) acrylates, acrylic acid (AA), styrene sulfonate, vinylsulfonic acid, vinylphosphonic acid, N-vinylacetamide, N-vinylformamide, diallyldimethylammonium chloride, and dimethylaminoethyl methacrylate (DMAEMA).

In still another aspect of the invention a method for forming a modified proppant is disclosed comprising the steps of obtaining a proppant particle; applying a hydrogel-coating to a surface of the proppant particle via a covalent attachment.

DETAILED DESCRIPTION OF THE INVENTION

Figure 1:
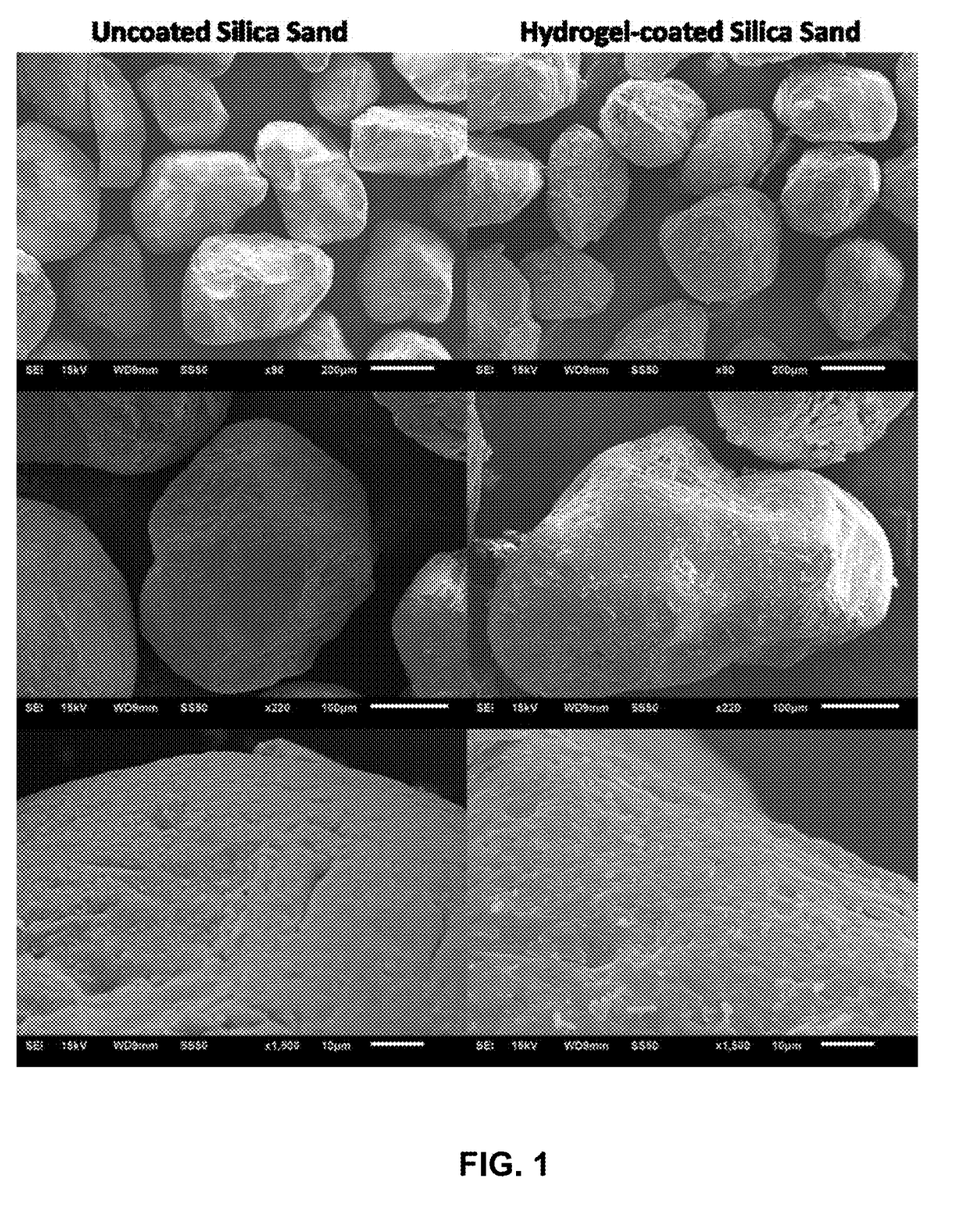
FIG. 1 is a SEM Image of uncoated and hydrogel-coated 40/70 silica sand.
Figure 2:
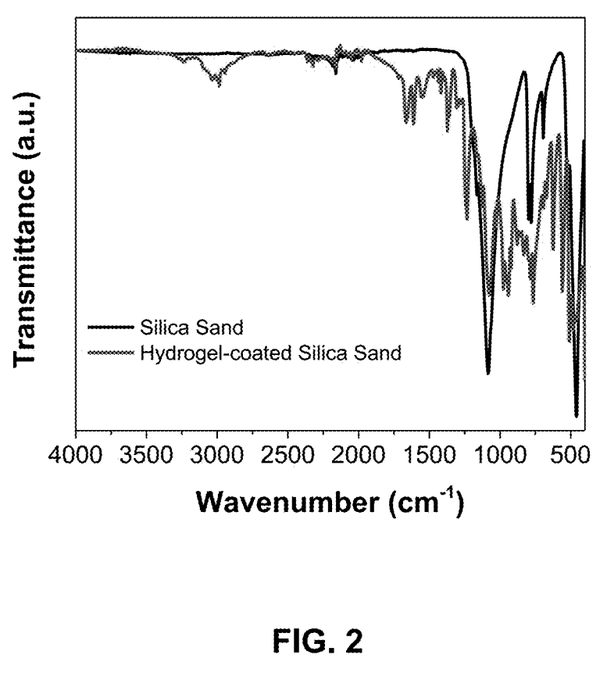
FIG. 2. is an infrared spectra of uncoated and hydrogel-coated 40/70 silica sand.
Figure 3:
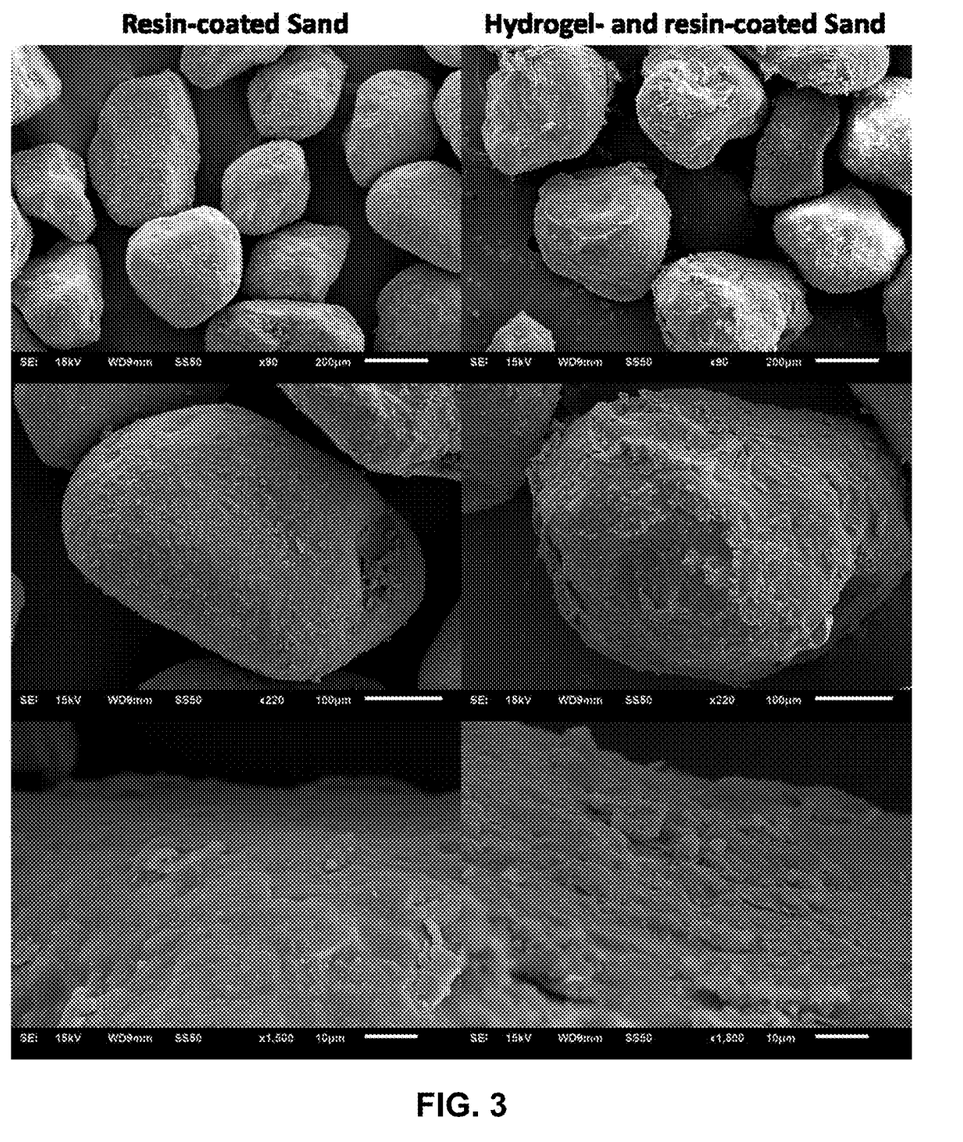
FIG. 3 is a SEM Image of resin-coated, and hydrogel- and resin-coated silica sand.
Figure 4:
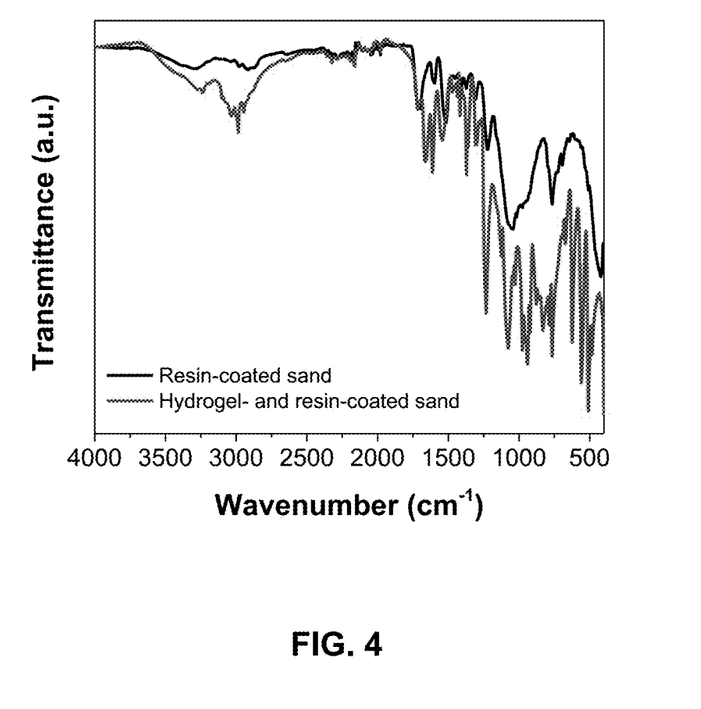
FIG. 4. is an infrared spectra of resin-coated, and hydrogel and resin-coated silica sand.
Figure 5:
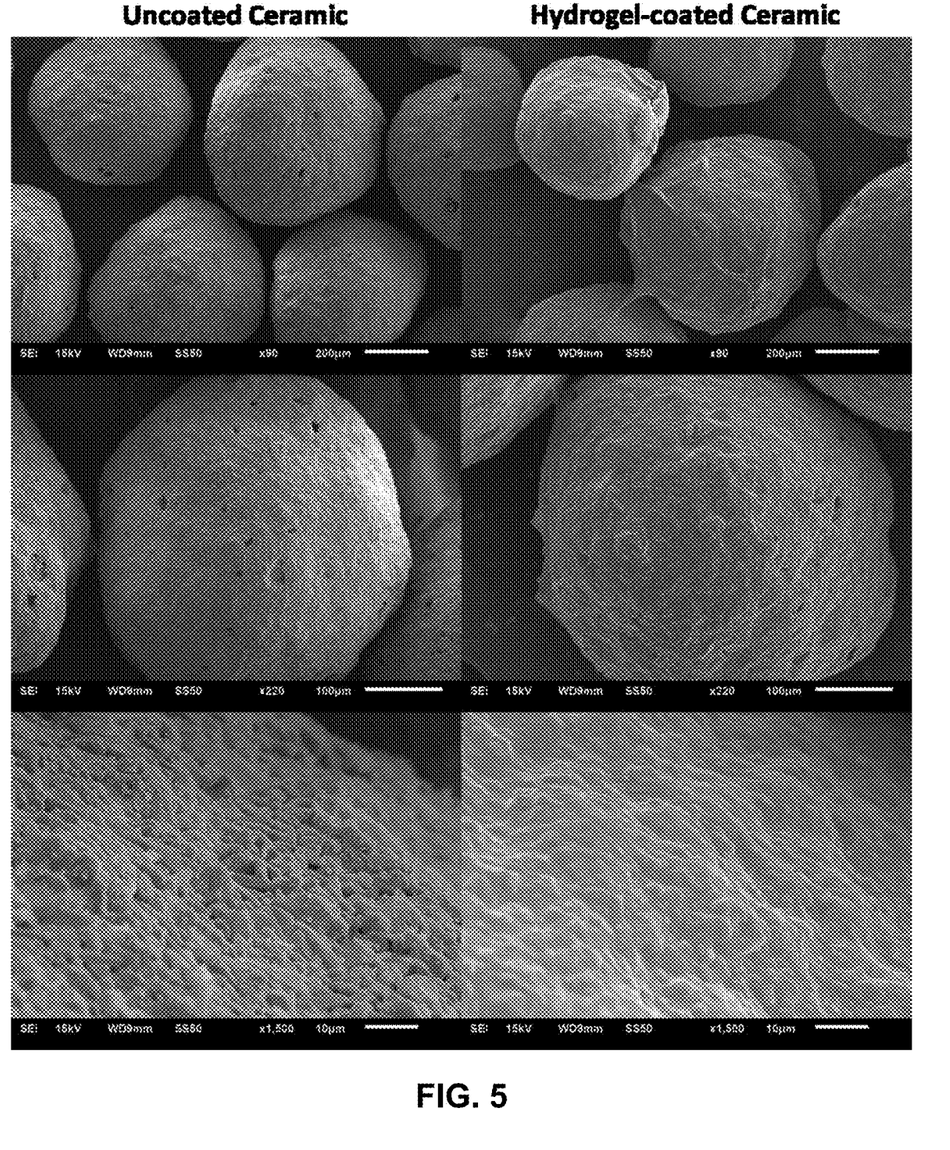
FIG. 5 is a SEM Image of uncoated and hydrogel-coated ceramic proppant.
Figure 6:
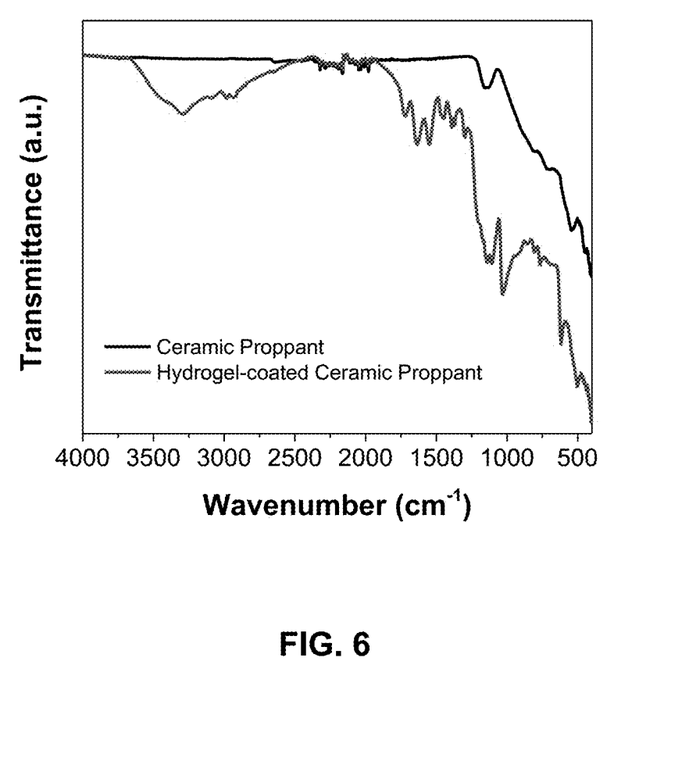
FIG. 6 is an infrared spectrum of uncoated and hydrogel-coated ceramic proppant.

Disclosed in this application are hydrogel-coated proppants, comprising a proppant particle and a hydrogel that is simultaneously crosslinked, polymerized and coated on the surface. The proppant coating can comprise of: 1) a water-swellable monomer and/or polymer, which is 2) copolymerized or grafted with monomers and/or polymers that can covalently attach to the proppant surface, monomers and/or polymers that are stimuli-responsive, crosslinkers, or a combination thereof. Polymers can either be in the form of non-reactive physical blend or telechelic reactive polymers that improve the coating stability or affect the swelling performance.

Proppant Particles

The compositions according to the invention include one or more same or different proppant that serve as a substrate which is modified to include a hydrogel. Various different types of proppants can be utilized as substrates and are well known to those of ordinary skill in the art. As used herein, proppants include substrates of any shape and average mesh size (200, 100, 60, 40, 20 mesh for example). For example, shapes of the proppant particles may be irregular, spherical, elongate, polygonal, fibrous, or the like, or any combination thereof.

The proppant can be selected from any group of materials to which a monomer can be covalently attached to a surface of the proppant. Examples of suitable proppants include, but are not limited to, sand, resin coated sand, polymer coated particles, thermoset coated particles, thermoplastic coated particles, ceramic materials, bauxite, metal, metal oxide, silica, nut shell, glass materials, and particles of a granular nature.

In embodiments, the proppants can include naturally occurring materials, for example nutshells that have been chipped, ground, pulverized or crushed to a suitable size (e.g., walnut, pecan, coconut, almond, ivory nut, brazil nut, and the like), or for example seed shells or fruit pits that have been chipped, ground, pulverized or crushed to a suitable size (e.g., plum, olive, peach, cherry, apricot, etc.), or for example chipped, ground, pulverized or crushed materials from other plants such as corn cobs. In embodiments, the proppants can be derived from wood or processed wood, including but not limited to woods such as oak, hickory, walnut, mahogany, poplar, and the like. In embodiments, aggregates can be formed, using an inorganic material joined or bonded to an organic material. Desirably, the proppant be comprised of particles (whether individual substances or aggregates of two or more substances) having a size in the order of mesh size 4 to 100 (US Standard Sieve numbers). As used herein, the term "particulate" includes all known shapes of materials without limitation, such as spherical materials, elongate materials, polygonal materials, fibrous materials, irregular materials, and any mixture thereof.

In embodiments, the particulate proppant can be formed as a composite from a binder and a filler material. Suitable filler materials can include inorganic materials such as solid glass, glass microspheres, fly ash, silica, alumina, fumed carbon, carbon black, graphite, mica, boron, zirconia, talc, kaolin, titanium dioxide, calcium silicate, and the like. In certain embodiments, the proppant can be reinforced to increase their resistance to the high pressure of the formation which could otherwise crush or deform them. Reinforcing materials can be selected from those materials that are able to add structural strength to the proppant, for example high strength particles such as ceramic, metal, glass, sand, and the like, or any other materials capable of being combined with a particulate substrate to provide it with additional strength.

In certain embodiments, the proppant particulate substrate can be fabricated as an aggregate of two or more different materials providing different properties. For example, a core having high compression strength can be combined with a buoyant material having a lower density than the high-compression-strength material. The combination of these two materials as an aggregate can provide a core particle having an appropriate amount of strength, while having a relatively lower density. As a lower density particle, it can be suspended adequately in a less viscous fracturing fluid, allowing the fracturing fluid to be pumped more easily, and allowing more dispersion of the proppants within the formation as they are propelled by the less viscous fluid into more distal regions. High density materials used as proppants, such as sand, ceramics, bauxite, and the like, can be combined with lower density materials such as hollow glass particles, other hollow core particles, certain polymeric materials, and naturally-occurring materials (nut shells, seed shells, fruit pits, woods, or other naturally occurring materials that have been chipped, ground, pulverized or crushed), yielding a less dense aggregate that still possesses adequate compression strength.

Aggregates suitable for use as proppant can be formed using techniques to attach the two components to each other. As one preparation method, a proppant can be mixed with the buoyant material having a particle size similar to the size of the proppant. The two types of particles can then be mixed together and bound by an adhesive, such as a wax, a phenol-formaldehyde novolac resin, etc., so that a population of doublet aggregate particles are formed, one subpopulation having a proppant attached to another similar particle, one subpopulation having a proppant attached to a buoyant particle, and one subpopulation having a buoyant particle attached to another buoyant particle. The three subpopulations could be separated by their difference in density: the first subpopulation would sink in water, the second subpopulation would remain suspended in the liquid, and the third subpopulation would float.

In a preferred embodiment, the proppant particles have at least a minimum amount of hydroxyl groups or hydrogen bonding promoter to be classified as a hydrogel. The presence of one or more hydroxyl groups on a surface of the proppant allows reaction together with a covalent connection to be formed with a monomer or other compound of the hydrogel-coating material that involves a vinyl or a non-vinyl reaction in the presence of a radical or a catalyst.

The proppant needs to have a surface having reactivity towards the coating composition in the formation of covalent and non-covalent interaction. This can include hydroxyl groups, silane surface, metal, carbon double bonds, acid groups, amine groups, and other ionic groups capable of stabilizing the hydrogel surface to have a preferential adhesion at the surface of the proppant. It should also be of appropriate size and shape including specific gravity that will enable mixing with the hydrogel compositions to provide an even coating surface.

Hydrogel-Coating Materials

The hydrogel-coating generally comprises a water-swellable monomer or polymer or a combination thereof that can be formed in one embodiment by copolymerizing monomers, wherein at least one of the monomers and/or polymers can covalently bond to the proppant surface and one or more monomers and/or polymers that can be swelled by water. Additional components can be present in the composition, namely monomers that are stimuli-responsive, crosslinkers, and combinations thereof.

Monomers and polymers that can be covalently liked to the proppant include various compounds having a functional group such as, but unlimited to, a silane, alkoxy silane, benzophenone, amine, thiol, carboxylic acid, phosphate or halide, or a combination thereof. The inclusion of the covalent-linking monomer and/or polymer in the hydrogel forming composition can be done before or during simultaneous polymerization and coating process. For the case of silane methacrylate, the silane reacts with the hydroxyl group on the proppant surface, while the methacrylate functional group provides sites at which the water swellable or hydrogel monomers and/or polymers can graft through or graft from. Alkoxysilane molecules are known to self-assemble on surfaces with hydroxyl groups. These groups attack the alkoxy group and displaces them, forming Si—O—Si bonds. Alkoxysilanes can be used on glass and metal oxide surfaces, forming bonds across interfaces. Sand is generally considered a finely divided rock usually composed of Si—$O_2$, though the exact composition may vary depending upon the source. The presence of hydroxyl groups on the surface of the proppant, such as sand makes them suitable for silanization. 3-(trimethyoxysilyl)propyl methacrylate (TMS-MA) is an alkoxysilane containing monomer which enables tethering of AMPS on sand.

Other suitable reactive groups that can result in covalent or non-covalent interaction with the proppant surface include those with reactivity towards the formation of covalent and non-covalent interaction. This can include hydroxyl groups, silane surface, metal, carbon double bonds, acid groups, amine groups, and other ionic groups capable of stabilizing the hydrogel surface and have a preferential adhesion at the surface of the proppant.

The hydrophilic monomers and/or polymers that can be swelled by water are numerous and include any monomer that can be copolymerized with the proppant linking monomer. Examples of suitable hydrophilic monomers include, but are not limited to, 2-acrylamido-2-methylpropane sulfonic acid (AMPS), acrylamide (AM), and N-isopropylacrylamide (NIPAM), hydroxyethyl methacrylate (HEMA), hydroxyethyl acrylate (HEA), poly(ethyleneglycol) acrylates, acrylic acid (AA), styrene sulfonate, vinylsulfonic acid, vinylphosphonic acid, N-vinylacetamide, N-vinylformamide, diallyldimethylammonium chloride, or dimethylaminoethyl methacrylate (DMAEMA). Other monomers that can be used are of nonhydrophilic nature including other vinyl monomers based an acrylate, methacrylate, butadiene, styrene, which are able to control the degree of hydrogel behavior and swelling properties by introducing more hydrophobic environment. This is also not limited to monofunctional monomers and di-function, tri-function, and multifunctional monomers can be involved in the crosslinking or branching of the polymer reactivity.

In various embodiments, the hydrogel-coating mixture is prepared by mixing the at least two different classes of monomers and/or polymers in a suitable solution, such as a solvent, and an initiator. Crosslinkers are additionally present in some embodiments. The polymerization process is a typical bulk or solution based free-radical polymerization and reactivity activated by temperature or light based on the presence of the initiator or self-polymerization of the monomers via radical generation. The most important function is the presence of an initiation, activation and the subsequent propagation, chain-transfer and termination typical of free-radical polymerization and reactions occurring with the proppant or particle substrate.

Any initiator that can start a polymerization reaction in the presence of the proppant particles can be utilized. The suitable initiators for free-radical generation can be in the form of temperature, light, or electron transfer activated initiators. Indicators include, but are not limited to, hydrogen peroxide, peroxide, peroxide esters, redox initiator, benzophenones, azobisbutyronitrile, thiol type chain transfer agents, stable radical initiators, and other common type initiators and radical generators for polymerization.

In various embodiments, further increases in mechanical stability of the resulting hydrogel-coating can be realized by polymerizing the aforementioned monomers and/or polymers with a monomer or oligomer or polymer crosslinker. Suitable cross-linkers can be small molecules such as ethyleneglycol dimethacrylate (EGDMA), N,N'-methylenebisacrylamide (MBAA), pentaerythritol triallyl ether, epichlorohydrin, divinylsulfone, and glycidyl methacrylate; or a polymer with functional groups that are reactive to either the hydrogel or the covalent linker such as poly(vinyl alcohol) (PVOH), poly(ethylene glycol) diacrylates and poly(ethylene glycol) dimethacrylates. Other acrylate, methacrylate, or vinyl groups attached to an oligomeric, polymeric, or nanoparticulate substrate which represents a functionality of three or more and otherwise an agent for multiple covalent bond formation (dendrimeric, hyperbranched, multi-arm, peripheral group in a nanoparticle) can be classified an used as crosslinker when mixed with the monomer composition. The degree of swelling behavior can be controlled by adjusting the degree of crosslinking of the coating. Adding too much crosslinker can significantly decrease the degree of swelling of the hydrogel coating and thus limit the self-suspending property of the modified proppant. The hydrogel is a hydrophilic polymeric network which is highly water adsorbent due to its hydrogen bonding with water molecules. The swelling capacity can be controlled by the monomer, and the type and degree of crosslinker used in the gel. Low density crosslinked hydrogels have higher absorbent capacity than highly crosslinked gels, however, they are softer. Highly crosslinked gels are firmer and can withstand higher stresses. Ethyleneglycol dimethacrylate is a difunctional methacrylate often used as a free radical copolymer crosslinker. Incorporation of EGDMA or any crosslinker in the polymer network improves mechanical properties.

The polymerization medium is desirably a liquid and preferably a solvent in which the monomers utilized are soluble. Examples of suitable solvents include, but are not limited to, water, dimethyl formamide, chloroform, ethanol, propanol, octane, hexane, toluene, dichloromethane, ether, ester, dimethylsulfoxide, tetrahydrofuran, anisole, cresol, and other common organic solvents, from polar to non-polar, of different dielectric constants. The main requirement is that the solvents or mixture of solvents should appropriately dissolve the monomers, the crosslinker, and the initiator such that if forms a coating on the granular and particle materials in a core-shell method or surrounding the particle core. A sufficient amount of solution medium is utilized such that desired polymerization and/or grafting is performed and the hydrogel is coated on the surface of the proppant utilized. This can be in the range of 1, 10, 20, 30 to about 50% volume/volume of solvent relative to the monomers, initiators, and other polymers added to complete the coating process.

Other Components

In addition, the hydrogel coating can be loaded with different additives that are either covalently bonded or trapped within the hydrogel matrix. These additives may include, but are not limited to, corrosion inhibitors, scaling inhibitors, biocides, fluid loss additives, tracers, or breakers. Additives that are non-covalently or covalently incorporated to the hydrogel can be released when the polymer breaker is introduced, temperature is changed, or pH of the solution is changed as stimuli. The manner can be classified as any stimuli-responsive event that results in release of the additive to the environment either during mixing, pumping, or once the proppant is lodged in the fracture in the formation during production. This provides better control of the time and the rate of release of the additives as compared to if the additives are just trapped in the hydrogel matrix.

EXAMPLES

Example 1

Free Radical Polymerization on Sand

The coating was prepared by combining AMPS, TMS-MA and 1 mg ammonium persulfate (APS) in 300 uL dimethylformamide (DMF) in a Teflon beaker. This solution was added to 1 g of sand (US Silica 40/70) and mixed by hand prior to heating in an oven to 100° C. overnight to initiate the polymerization and remove the solvent.

Example 2

Effect of the Concentration of the Silane Comonomer 100 mg AMPS was copolymerized with varying amounts of TMS-MA to determine its effect on the swelling behavior of the hydrogel. The monomers were dissolved in DMF and the polymerization was initiated by APS. 1 g sand was added into the solution, mixed and heated at 100° C. Bed height test was performed by placing 500 mg of sand into a vial. 20 mL water was added to the vial. The vial was inverted 10 times and allowed to settle for 30 min. After which, the bed height was measured. Bed height was also measured after 24 h.

| Sample number | AMPS (mg) | TMS-MA (mg) | EGDMA (mg) | Bed Height (30 min) | Bed Height (24 hours) |
|---|---|---|---|---|---|
| 1 | 100 | 0 | 0 | 2 | 2 |
| 2 | 100 | 5 | 0 | 8.5 | 19 |
| 3 | 100 | 10 | 0 | 6.5 | 12 |
| 4 | 0 | 100 | 0 | 3 | 3 |

Example 3

Effect of the Concentration of the Crosslinker

AMPS, TMS-MA, APS and varying amounts of EGDMA were dissolved in DMF. 1 g sand was added into the solution, mixed and heated at 100° C. The bed height test was performed according to the procedure in Example 2.

| Sample number | AMPS (mg) | TMS-MA (mg) | EGDMA (mg) | Bed Height (30 min) | Bed Height (24 hours) |
|---|---|---|---|---|---|
| 5 | 100 | 0 | 5 | 8 | 6.5 |
| 6 | 100 | 5 | 5 | 6 | 6.5 |
| 7 | 100 | 5 | 10 | 5 | 5 |
| 8 | 0 | 0 | 100 | 3 | 3 |
| 14 | 100 | 10 | 5 | 4 | 6.5 |
| 15 | 100 | 10 | 10 | 3.5 | 3.5 |

Example 4

Using Water as the Solvent

The use of water for dissolving the reactants and as a solvent during polymerization was also studied. Water as a reaction medium avoids health and safety risks. 100 mg AMPS was polymerized with varying amounts of TMS-MA and EGDMA in 200 uL water at 50° C. with APS as the initiator. The bed height test was performed according to the procedure in Example 2.

| Sample number | AMPS (mg) | TMS-MA (mg) | EGDMA (mg) | Bed Height (30 min) | Bed Height (24 hours) |
|---|---|---|---|---|---|
| 22 | 100 | 5 | 0 | 27 | 10 |
| 23 | 100 | 5 | 5 | 8 | 9 |
| 24 | 100 | 5 | 10 | 5 | 6 |
| 25 | 100 | 10 | 0 | 22 | 6 |
| 26 | 100 | 10 | 5 | 11 | 12 |
| 27 | 100 | 10 | 10 | 5 | 5 |

Example 5

Copolymerization with Acrylamide in Water

Acrylamide is a cheap hydrogel forming monomer. The effect of adding AM monomer on the swelling behavior of the polymer coating was studied. Different ratios of AMPS and AM were used and polymerized at 50° C. with TMS-MA and EGDMA using APS as initiator. Bed heights were measured after 30 min and 24 h following the procedure discussed in Example 2.

| Sample number | AMPS (mg) | AM (mg) | TMS-MA (mg) | EGDMA (mg) | Bed Height (30 min) | Bed Height (24 hours) |
|---|---|---|---|---|---|---|
| 22 | 100 | 0 | 5 | 0 | 27 | 10 |
| 34 | 80 | 20 | 5 | 0 | 28 | 26 |
| 35 | 80 | 20 | 5 | 5 | 13 | 11 |
| 36 | 50 | 50 | 5 | 0 | 15 | 18 |
| 37 | 50 | 50 | 5 | 5 | 9 | 9 |
| 38 | 0 | 100 | 5 | 0 | 4 | 4 |
| 39 | 0 | 100 | 5 | 5 | 3 | 3 |

Example 6

Addition of a Temperature-Responsive Monomer

A temperature-responsive hydrogel coating was generated by adding N-isopropylacrylamide (NIPAM) in the coating formulation. NIPAM has a lower critical solution temperature (LCST) in aqueous medium of around 32° C. AMPS, NIPAM, TMS-MA and EGDMA monomers of varying amounts were polymerized on the proppant surface by free radical polymerization, which is initiated by APS in DMF at 100° C. overnight. The bed height was measured after 30 min at room temperature and after heating at 40° C. following the procedure discussed in Example 2.

| Sample number | AMPS (mg) | NIPAM (mg) | TMS-MA (mg) | EGDMA (mg) | Bed Height (30 min, 25° C.) | Bed Height (30 min, >32° C.) |
|---|---|---|---|---|---|---|
| 9 | 100 | 10 | 5 | 5 | 6 | 6 |
| 10 | 100 | 10 | 5 | 10 | 4 | 5 |
| 11 | 100 | 50 | 5 | 5 | 9 | 9 |
| 12 | 100 | 50 | 5 | 10 | 7 | 6 |
| 13 | 0 | 100 | 0 | 0 | 2 | 2 |

Example 7

PVOH as the Crosslinker and Hydrogel Aid

Alkoxysilanes are known to react with other molecules bearing hydroxyl groups. Poly(vinyl alcohol) is a water soluble polymer composed of 1,3-diol linkages. The hydroxyl groups on the polymer can be used to crosslink the polymer network around the proppant by forming Si—O bonds with TMS-MA and also aid in hydrogel formation through H-bonding. Two different molecular weights of PVOH at increasing concentrations were added to a mixture of AMPS, TMS-MA and APS in water. After adding 1 g of sand to the mixture, the polymerization was performed at 50° C. overnight. The bed height was then measured after 30 min and 24 h following the procedure discussed in Example 2.

| Sample number | AMPS (mg) | TMS-MA (mg) | PVOH (mg, MW) | Bed Height (30 min) | Bed Height (24 hours) |
|---|---|---|---|---|---|
| 22 | 100 | 5 | 0 | 27 | 10 |
| 44 | 100 | 5 | 1, 3k | 30 | 20 |
| 40 | 100 | 5 | 5, 3k | 21 | 17 |
| 41 | 100 | 5 | 10, 3k | 20 | 23 |
| 45 | 100 | 5 | 1, 14k | 12 | 8 |
| 42 | 100 | 5 | 5, 14k | 11 | 12 |
| 43 | 100 | 5 | 10, 14k | 12 | 13 |

Example 8

Adhesive Monomer is Coated Before the Hydrogel is Polymerized

Example 8.1

Effect of Concentration of Silane and Crosslinker 5 or 10 mg TMS-MA was dissolved in 200 uL toluene prior to the addition of 1 g sand. After a thorough mixing, the solvent was evaporated in vacuum. Predetermined amounts of AMPS, EGDMA and APS were dissolved in 300 uL DMF and added to the TMS-MA coated sand. The mixture was heated to 100° C. overnight. The bed height was then measured after 30 min and 24 h following the procedure discussed in Example 2.

| Sample number | AMPS (mg) | TMS-MA (mg) | EGDMA (mg) | Bed Height (30 min) | Bed Height (24 hours) |
|---|---|---|---|---|---|
| 20 | 100 | 5 | 0 | 6 | 9 |
| 21 | 100 | 10 | 0 | 5 | 8 |
| 16 | 100 | 5 | 5 | 7 | 8 |
| 17 | 100 | 5 | 10 | 4 | 4 |
| 18 | 100 | 10 | 5 | 4 | 5 |
| 19 | 100 | 10 | 10 | 3 | 3.5 |

Example 8.2

Using Water as the Solvent for Polymerization

An identical method was applied as described above with the exception that 200 uL water was used as the solvent in place of toluene and DMF, and the polymerization was performed at 50° C. The bed height test was performed as discussed in Example 2.

| Sample number | AMPS (mg) | TMS-MA (mg) | EGDMA (mg) | Bed Height (30 min) | Bed Height (24 hours) |
|---|---|---|---|---|---|
| 28 | 100 | 5 | 0 | 18 | 30 |
| 29 | 100 | 5 | 5 | 8 | 12 |
| 30 | 100 | 5 | 10 | 8 | 14 |
| 31 | 100 | 10 | 0 | 15 | 31 |
| 32 | 100 | 10 | 5 | 8 | 14 |
| 33 | 100 | 10 | 10 | 7 | 10 |

Example 8.3

Copolymerization with Acrylamide in Water 5 mg TMS-MA was dissolved in 200 uL water prior to the addition of 1 g sand. After mixing, the solvent was evaporated in vacuum. Different ratios of AMPS and AM were dissolved in water, along with EGDMA and APS, and polymerized at 50° C. overnight. Bed heights were measured after 30 min and 24 h following the procedure discussed in Example 2.

| Sample number | AMPS (mg) | AM (mg) | TMS-MA (mg) | EGDMA (mg) | Bed Height (30 min) | Bed Height (24 hours) |
|---|---|---|---|---|---|---|
| 20 | 100 | 0 | 5 | 0 | 6 | 9 |
| 54 | 80 | 20 | 5 | 0 | 26 | 43 |
| 55 | 80 | 20 | 5 | 5 | 8 | 6 |
| 56 | 50 | 50 | 5 | 0 | 15 | 25 |
| 57 | 50 | 50 | 5 | 5 | 6 | 4.5 |
| 58 | 0 | 100 | 5 | 0 | 4 | 3 |
| 59 | 0 | 100 | 5 | 5 | 4 | 3 |

Example 9

Hydrogel Coating on Polymer Resin-Coated Sand

Example 9.1

Hydrogel and Adhesive Monomer are Mixed Before Polymerization

Aside from bare sand, the hydrogel can be polymerized on polymer resin-coated sand. An identical method was applied as described in example 4 with the exception that a resin-coated sand was used (Preferred Sand Garnet 40/70). 100 mg AMPS was polymerized with varying amounts of TMS-MA and EGDMA in 200 uL water at 50° C. with APS as the initiator. The bed height test was performed according to the procedure in Example 2.

| Sample number | AMPS (mg) | Silane (mg) | EGDMA (mg) | Bed Height (30 min) | Bed Height (24 hours) |
|---|---|---|---|---|---|
| 46 | 100 | 5 | 0 | 21 | 7 |
| 47 | 100 | 10 | 0 | 21 | 8 |
| 48 | 100 | 5 | 5 | 8 | 6 |
| 49 | 100 | 10 | 5 | 7 | 6 |

Example 9.2

Adhesive Monomer is Coated Before the Hydrogel Polymerization 1 g resin-coated sand was added to a solution of TMS-MA in 200 uL water and mixed thoroughly by hand. After removing the solvent, a solution of AMPS, EGDMA and APS in water was added to the proppant. The polymerization was run at 50° C. overnight. Bed heights were measured after 30 min and 24 h following the procedure discussed in Example 2.

| Sample number | AMPS (mg) | TMS-MA (mg) | EGDMA (mg) | Bed Height (30 min) | Bed Height (24 hours) |
|---|---|---|---|---|---|
| 60 | 100 | 5 | 0 | 28 | 2 |
| 61 | 100 | 10 | 0 | 31 | 7 |
| 62 | 100 | 5 | 5 | 5 | 4 |
| 63 | 100 | 10 | 5 | 8 | 7 |

Example 10

Hydrogel Coating on Ceramic Proppant

Example 10.1

Hydrogel and Adhesive Monomer are Mixed Before Polymerization

Aside from bare sand, the hydrogel can be polymerized on ceramic proppants as it has surface hydroxyl groups that are capable of forming bonds with the alkoxysilane monomer. An identical method was applied as described in example 4 with the exception that a ceramic proppant (Carboceramics Carboprop 30/60) was used.

| Sample number | AMPS (mg) | TMS-MA (mg) | EGDMA (mg) | Bed Height (30 min) | Bed Height (24 hours) |
|---|---|---|---|---|---|
| 50 | 100 | 5 | 0 | 22 | 24 |
| 51 | 100 | 10 | 0 | 19 | 25 |
| 52 | 100 | 5 | 5 | 13 | 13 |
| 53 | 100 | 10 | 5 | 10 | 8.5 |

Example 10.2

Adhesive Monomer is Coated Before the Hydrogel Polymerization

An identical method was applied as described in Example 9.2 with the exception that a ceramic proppant was used. The bed height test was performed as discussed in Example 2.

| Sample number | AMPS (mg) | TMS-MA (mg) | EGDMA (mg) | Bed Height (30 min) | Bed Height (24 hours) |
|---|---|---|---|---|---|
| 64 | 100 | 5 | 0 | 20 | 20 |
| 65 | 100 | 10 | 0 | 22 | 20 |
| 66 | 100 | 5 | 5 | 11 | 12 |
| 67 | 100 | 10 | 5 | 7 | 10 |

Example 11

Shear Test 5 g of samples 6, 48 and 52, which correspond to sand, resin-coated sand, and ceramic proppant coated with hydrogel, were placed in a 150 mL beaker. 100 mL of water was added into the beaker. The hydrogel coating was allowed to swell for 30 min and the bed height was noted. The mixture was stirred for 30 s at 300 rpm and 20 min at 200 rpm using a blender-mixer. The bed height was again measured after the mixing.

Example 12

Compression Resistance 39.7 g of proppant is loaded in the crush resistance cell. Pressure of 5000 psi is applied. The uncrushed proppant is collected and weighed.

| # | AMPS | TMS-MA | EGDMA | AM | % uncrushed | # | % uncrushed |
|---|------|--------|-------|-----|-------------|---|-------------|
| 0 |      |        |       |     | 95.1%       | 0 | 95.1%       |
| 1 | 100  | 5      |       |     | 95.3%       | 6 | 95.9%       |
| 2 | 100  | 10     |       |     | 95.4%       | 7 | 95.1%       |
| 3 | 100  | 5      | 5     |     | 95.1%       | 8 | 95.5%       |
| 4 | 100  | 5      | 10    |     | 93.4%       | 9 | 93.3%       |
| 5 | 50   | 5      | 5     | 50  | 95.6%       |   |             |

Example 13

Acid Solubility Test

Coated proppant is heated in 3:1 HCl:HF solution for 30 mins at 66° C. The weight difference before and after the solubility test is measured and was used in calculating for the acid solubility.

|   |      |        |       |    |                 |       | Silane attached first | |
|---|------|--------|-------|-----|----------------|-------|---|---|
| # | AMPS | TMS-MA | EGDMA | AM | Acid solubility | TGA | # | Acid solubility | TGA |
| 0 |      |        |       |    | 0.64%           | 0   | 0 | 0.64% | 0 |
| 1 | 100  | 5      |       |    | 12.7%           | 13.4% | 6 | 12.1% | 10.5% |
| 2 | 100  | 10     |       |    | 12.6%           | 15.3% | 7 | 12.8% | 6.9% |
| 3 | 100  | 5      | 5     |    | 4.4%            | 18.4% | 8 | 3.5% | 6.8% |
| 4 | 100  | 5      | 10    |    | 8.6%            | 9.7% | 9 | 10.3% | 5.5% |
| 5 | 50   | 5      | 5     | 50 | 3.2%            |       |   |       |       |

While in accordance with the patent statutes the best mode and preferred embodiment have been set forth, the scope of the invention is not intended to be limited thereto, but only by the scope of the attached claims.

What is claimed is:

1. A modified proppant, comprising:
a proppant particle and a hydrogel-coating covalently bonded to the proppant particle, the hydrogel-coating derived from a composition including at least one monomer that is covalently attached to the proppant particle and at least one monomer that is water swellable and copolymerized to the at least one monomer covalently attached to the proppant particle using an initiator that is one or more of hydrogen peroxide, peroxide, peroxide ester, redox initiator, benzophenone, azobisbutyronitrile, and thiol type chain transfer agent,
wherein the at least one water swellable monomer is one or more of 2-acrylamido-2-methylpropane sulfonic acid (AMPS), acrylamide (AM), and N-isopropylacrylamide (NIPAM), hydroxyethyl methacrylate (HEMA), hydroxyethyl acrylate (HEA), poly(ethylene glycol) acrylates, acrylic acid (AA), styrene sulfonate, vinyl-sulfonic acid, vinylphosphonic acid, N-vinylacetamide, N-vinylformamide, diallyldimethylammonium chloride, and dimethylaminoethyl methacrylate (DMAEMA), and
wherein the at least one monomer covalently attached to the proppant particle has a functional group that is one or more of a silane, alkoxy silane, benzophenone, amine, thiol, carboxylic acid, phosphate and a halide, and wherein the functional group covalently attaches the at least one monomer to the proppant particle.

2. The modified proppant according to claim 1, wherein the at least one monomer covalently attached to the proppant particle is derived from 3-(trimethoxysilyl)propyl methacrylate and a silane acrylate derivative.

3. The modified proppant according to claim 2, wherein the modified proppant further includes a crosslinker that is one or more of ethyleneglycol dimethacrylate (EGDMA), N,N'-methylenebisacrylamide (MBAA), pentaerythritol triallyl ether, epichlorohydrin, divinylsulfone, and glycidyl methacrylate; or a polymer with functional groups that are reactive to either the hydrogel or the at least one covalently attached monomer.

4. The modified proppant according to claim 3, wherein the proppant particle is one or more of sand, resin coated sand, a polymer coated particle, a thermoset coated particle, a thermoplastic coated particle, a ceramic particle, bauxite, a metal, a metal oxide, silica, a nut shell, glass, a fruit pit, and a wood particle.

5. The modified proppant of claim 1, wherein the hydrogel-coating contains at least one additive selected from one or more of a corrosion inhibitor, scaling inhibitor, breaker, viscosity modifier, surfactant, or any chemical additive or catalyst that is released as a function of time.

6. The modified proppant of claim 1, wherein the hydrogel-coating can change a property thereof with a stimuli that is one or more of temperature, pH, ionic strength, pressure, light, and shear stress.

7. The modified proppant of claim 3, wherein the crosslinker comprises one or more of polyvinyl alcohol, polyethylene glycol diacrylate, and polyethylene glycol dimethacrylate.

8. A method for forming the modified proppant according to claim 1, comprising the steps of:
obtaining the proppant particle;
applying the hydrogel-coating to a surface of the proppant particle via the covalent bonding.

9. The method according to claim 8, wherein the step of applying the hydrogel-coating includes the step of polymerizing the at least one monomer including the functional group covalently attachable to the proppant particle and the at least one monomer that is water swellable in the presence of the proppant particle.

10. The method according to claim 9, wherein the polymerization step further includes a crosslinker, the initiator, and solvent.

11. The method according to claim 10, further including the step of mixing the at least one water swellable monomer, the at least one monomer including the functional group covalently attachable to the proppant particle, the crosslinker, the initiator, the solvent, and optionally additives prior to initiating the polymerization.

12. The method according to claim 10, further including the step of attaching the at least one monomer including the functional group covalently attachable to the proppant particle on the proppant particle before adding the at least one water swellable monomer, the crosslinker, the initiator, the solvent, and optional additives and initiating polymerization.

13. The method according to claim 10, wherein the solvent is one or more of water, toluene, dimethylformamide, tetrahydrofuran and hexane.

\* \* \* \* \*